United States Patent
Lanham, Jr.

(10) Patent No.: US 6,523,727 B2
(45) Date of Patent: Feb. 25, 2003

(54) DOUGH FEEDING UNIT

(75) Inventor: William E. Lanham, Jr., Sidney, OH (US)

(73) Assignee: Peerless Machinery Corp., Sidney, OH (US)

( * ) Notice: Subject to any disclaimer, the term of this patent is extended or adjusted under 35 U.S.C. 154(b) by 0 days.

(21) Appl. No.: 09/836,891

(22) Filed: Apr. 17, 2001

(65) Prior Publication Data

US 2001/0038875 A1 Nov. 8, 2001

Related U.S. Application Data

(60) Provisional application No. 60/200,032, filed on Apr. 26, 2000.

(51) Int. Cl.[7] .............................. B01F 15/02; B01F 7/00; A21D 6/00
(52) U.S. Cl. .................... 222/413; 222/415; 366/156.1; 366/320; 426/519; 426/496; 425/209
(58) Field of Search ................................ 426/519, 496; 366/156.1, 320; 425/208, 209; 222/412, 413, 415

(56) References Cited

U.S. PATENT DOCUMENTS

| | | | |
|---|---|---|---|
| 1,852,764 A | | 4/1932 | Wentworth |
| 4,113,819 A | | 9/1978 | Hayashi et al. |
| 4,222,502 A | | 9/1980 | Gubitose et al. |
| 4,332,538 A | | 6/1982 | Campbell |
| 4,424,236 A | | 1/1984 | Campbell |
| 4,444,509 A | | 4/1984 | Steiner et al. |
| 4,449,908 A | | 5/1984 | Campbell |
| 4,500,209 A | | 2/1985 | Steiner et al. |
| 4,517,212 A | | 5/1985 | Campbell |
| 4,661,364 A | | 4/1987 | Campbell |
| 4,691,625 A | | 9/1987 | Blain et al. |
| 4,960,601 A | * | 10/1990 | Cummins ..................... 366/85 |
| 5,092,453 A | | 3/1992 | Bruke |
| 5,264,232 A | * | 11/1993 | Campbell ..................... 425/311 |
| 5,302,017 A | * | 4/1994 | Platek et al. ................. 366/185 |
| 5,327,817 A | | 7/1994 | Zittel |
| 5,479,847 A | * | 1/1996 | Powers et al. ............... 222/255 |
| 5,554,221 A | | 9/1996 | Center et al. |
| 5,752,431 A | | 5/1998 | Zittel |
| 5,840,345 A | | 11/1998 | Ayash |
| 5,858,438 A | | 1/1999 | Cummins et al. |
| 6,096,201 A | | 8/2000 | Bruke |
| 6,109,478 A | * | 8/2000 | Blenkinsop et al. ........ 177/119 |
| 6,129,037 A | | 10/2000 | Watts et al. |
| 6,303,168 B1 | * | 10/2001 | Campbell .................... 425/239 |

OTHER PUBLICATIONS

Screw Conveyors, http://www.martinconveyor.com/screw.htm, Aug. 31, 1999, 1 page.

* cited by examiner

Primary Examiner—Henry C. Yuen
Assistant Examiner—Stephanie Willatt
(74) Attorney, Agent, or Firm—Killworth, Gottman, Hagan & Schaeff LLP

(57) ABSTRACT

A metering unit for dough and related foodstuffs having a dough feeder unit, support structure, dough hopper, effluent housing, drive motor and centerless helix, with the effluent housing including an inlet, center and outlet section. The centerless helix is disposed within the effluent housing, and is rotatably coupled to the drive motor. Dough is fed into an aperture in the input section of the effluent housing, and upon rotation of the centerless helix, is discharged from the outlet section of the effluent housing. The internal flowpath of the effluent housing can include a separate discharge liner to prevent the centerless helix from contacting the flowpath wall. Additional control mechanisms can be included to limit motor power output and protect the system in event of an overpressure condition. The system is portable, and can be coupled to a conventional conveyor system to create an integrated approach to dough metering and transport.

25 Claims, 5 Drawing Sheets

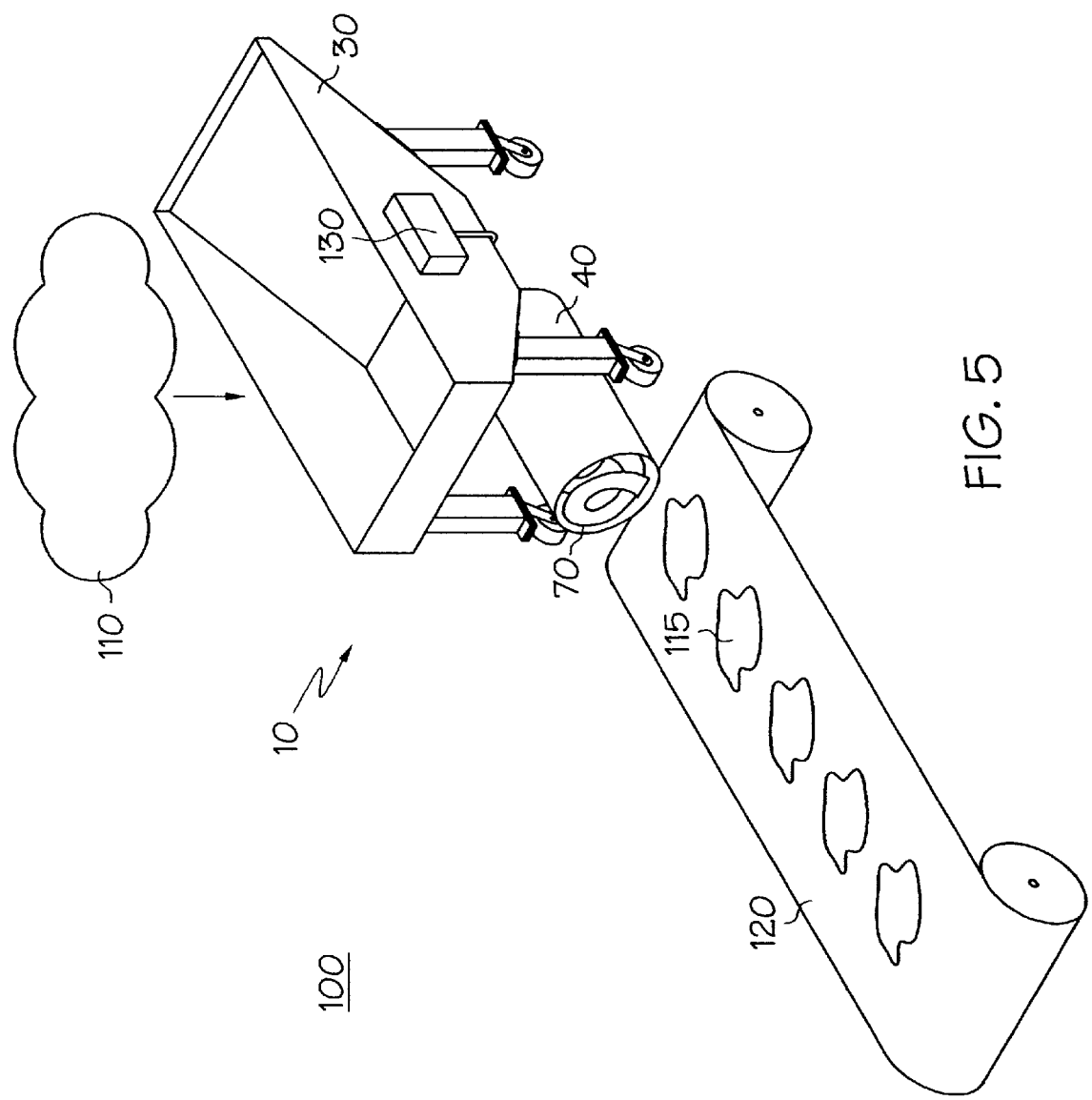

DOUGH FEEDING UNIT

This application claims the benefit of U.S. Provisional Application No. 60/200,032 filed Apr. 26, 2000.

BACKGROUND OF THE INVENTION

The present invention generally relates to a flow control device for dough and related viscous foodstuffs, and more particularly to a metering device that employs a centerless helix member to portion out precise quantities of dough for subsequent use in bread and related baked goods.

The use of pumps and conveyors for moving and metering large quantities of dough are well-known in the art. Typically, such devices accept a dough mixture from a hopper, then transport it with either an auger mounted to a screw-like shaft housed in a closed or semi-closed tubular chamber, or a lobe-like intermeshed positive-displacement pump connected to a discharge conduit. In either situation, the dough is typically pumped and discharged to a moving conveyor, which takes the dough to a divider for cutting and subsequent processing. Metering, or the ability to divide the dough up into discrete quantities, can be incorporated into either approach; in the former case, a separate paddle or knife can be added, set to deploy during preset intervals, while in the latter case, the very nature of a positive displacement pump that operates on a fixed quantity of dough lends itself to metering functions when combined with an appropriate discharge conduit. This capability gives such pumps the ability to portion discrete amounts of dough, rather than more massive continuous quantities, which can be beneficial in situations that require consistent, repeatable dough portions. Devices that provide this additional metering, or dividing of dough are also well-known in the art.

However, each of these approaches have disadvantages. With the shaft-mounted auger approach, the dough has a tendency to stick to the center shaft, resulting in handling difficulties and inconsistent quantities being dispensed, as well as more costly downtime for cleaning and maintenance. Large, wetted surface areas with regions of little or no flow that are not problematic with low viscosity fluids (such as water) become "traps" for stickier, more flow-resistant substances. Such surface configurations are prevalent in shaft-mounted auger systems. For example, shank portions connecting the base of the auger to the shaft often cannot generate enough movement, especially at low shaft revolutions per minute (rpm) to keep dough buildup from occurring. Consequently, without a continuous purging action, the buildup of dough can congeal, thus clogging up the auger and discharge conduit. In addition, the greater resistance to flow caused by the buildup necessitates higher power motors to run the auger, as well as reduced throughput due to increased flow obstruction. With the positive-flow pump-based process, which relies on a constant volume basis for the dispensing of accurate dough quantities, the addition of yeast in the dough produces density variations due to gas byproduct formation, which can cause weight discrepancies in the divided-up dough, making it more difficult to produce uniform products. Moreover, shearing and compacting forces imparted on the dough by the pump causes increased temperature and pressure profiles within the dough, which can adversely effect the dough's subsequent utility as an edible final product. The active nature of the dough, caused by the aforementioned addition of yeast, presents other challenges to dough handling devices, not the least of which is the rapidity with which dough must be moved. This need for speed and high throughput in dough handling is often at odds with a need to keep the work performed in the dough low during metering and transport.

In other types of dough compositions (such as cookie dough), where yeast is not included, the consistency is such that once the dough is compacted (such as due to pumping), it becomes difficult to transport or meter, as it hardens and can't readily be made to revert back into its pre-compacted state. The conventional screw and positive displacement pump systems, by virtue of the work they do on the dough, are largely responsible for the creation of this undesirable condition. Edible additives to the dough (such as nuts, chocolate chips, decorations and the like) exacerbate dough transport and metering in conventional screw- or pump-based systems. In one regard, the additives act as reinforcing members, giving the dough a quasi-composite consistency, which tends to increase its resistance to flow. In another regard, the conventional screw and pump systems may slice up the additives, thus reducing the quality and subsequent appeal of the dough to a potential consumer.

Consequently, what is needed is a dough metering system that promotes consistent, reliable metering while simultaneously minimizing temperature and pressure elevations in the dough. What is also needed is a dough metering system that can meet the above needs for various dough compositions.

BRIEF SUMMARY OF THE INVENTION

This need is met by the present invention wherein a dough feeder system meters precise amounts of dough without the disadvantages of the prior art. In accordance with one embodiment of the present invention, a dough transport system is disclosed. The system includes a dough feeding unit and a conveyor unit. The dough feeding unit includes a primary support structure, a motor coupled to the primary support structure, a hopper with dough input and output openings, an effluent housing comprising inlet, outlet and center sections, and a centerless helix with proximal and distal ends. The centerless helix is disposed within and extends through the effluent housing, and is rotatably responsive to the motor through a coupling at the proximal end of the centerless helix. The helix defines an axis of rotation along its centerline. The proximal end of the centerless helix includes either a flattened portion to promote secure, thorough mounting to a rotatable coupling disposed within an endwall of the effluent housing, or is coupled to a stub shaft, which itself is rotatably mounted to an endwall in the effluent housing. The endwall of the effluent housing is in axial alignment with the centerline of the centerless helix. The effluent housing is adjacent the hopper and mounted to the primary support structure. Its inlet section is aligned with the dough output opening of the hopper, while its outlet section is aligned to dispense a metered dough portion to the conveyor unit. Preferably, the alignment between the effluent housing inlet section and the hopper dough outlet opening is a vertical alignment to encourage gravity feed from the latter to the former. The center section is disposed between the inlet section and the outlet section, and connects the two. The conveyor unit is operably mounted in relation to the outlet section of the effluent housing, and is used to carry away metered dough portions being discharged from the effluent housing. The construction and movement of the dough feeder unit is such that a continuous dough path from the hopper through the effluent housing is effected, and upon placement of a quantity of the dough in the hopper and selective rotation of the centerless helix, a discrete quantity of dough is metered and deposited upon the conveyor unit without an appreciable rise in pressure or temperature due to the action of the dough transport system. The dough transport system can be configured to operate in either a continuous mode, where variable helix speeds may be employed to control dough flow rate, or in an intermittent mode, where the stop/start sequence produces discrete dough chunks.

Optionally, the dough transport system includes the use of food-grade stainless steel or related material for the surfaces of the hopper, effluent housing and centerless helix. The dough transport system can also include a torque-limiting device as a safety measure to protect the system in the event a flow obstruction arises during system operation, or a foreign object becomes lodged somewhere in the dough flowpath. The effluent housing further comprises a discharge liner disposed within the effluent housing. Such liner could be made of an abrasion-resistant ultrahigh molecular weight (UHMW) polyethylene to minimize the likelihood of metal-to-metal contact between the helix and the inner walls of the effluent housing.

In addition, a motor controller can be included to limit the power output of the motor. In a preferred embodiment, the controller can limit power output to a maximum of approximately 1 horsepower. This can be valuable in situations where an oversized motor used to drive the helix needs to conform to the low-power requirements of the dough being transported. Either cumulatively or in the alternative, the maximum power output of the motor used in the system may be limited to approximately 1 horsepower. In contrast to conventional motors, which are typically sized in the 15 to 30 horsepower range in order to drive a screw auger or positive displacement pump, an may generate internal pressures within the dough of upwards of 20 to 30 pounds per square inch (psi), the low power motors used in conjunction with the present invention, with the relatively shear-free movement and metering of the dough inherent in the centerless helix approach, will ensure that such pressures are not generated in the dough, and that resulting premature dough processing is avoided. The high pressure levels exhibited by the larger horsepower motors, if left unabated, would impart significant work on the dough. A variable-frequency speed control may also be used to provide adjustable dough feed rates. To facilitate the positioning of the dough feeding unit relative the conveyor unit, casters may be disposed on a lower surface of the primary support structure, thus enhancing its mobility.

In accordance with another embodiment of the present invention, a dough feeding unit is disclosed. The dough feeding unit includes a primary support structure, motor, hopper, effluent housing and centerless helix in a configurationally similar approach to that of the dough feeding unit portion of the previous embodiment. The flexible, portable nature of the dough feeding unit permits it to be placed in proximity with a conventional conveyor system, capable of a variety of operational speeds that are compatible with conveyor motion.

Optionally, the dough feeding unit includes the use of food-grade stainless steel or related material for the surfaces of the hopper, effluent housing and centerless helix in a manner similar to that of the previous embodiment. It can also include a torque-limiting device as a safety measure, as well as a discharge liner disposed within the effluent housing, both similar to that of the previous embodiment. In addition, a motor controller can be included to limit the power output of the motor, or have a maximum motor power output of not more than approximately 1 horsepower, which, also like the previous embodiment, may include variable-frequency speed control to provide adjustable dough feed rates. To facilitate the positioning of the dough feeding unit, casters may be disposed on a lower surface of the primary support structure, thus enhancing its mobility.

In accordance with yet another embodiment of the present invention, a method of metering dough is disclosed. The method includes loading a mass of dough into a hopper; rotatably operating a centerless helix disposed within an effluent housing, where the effluent housing is disposed adjacent to and in dough communication with the hopper; accepting at least a portion of the mass of dough into an aperture disposed in an input section of the effluent housing; and adjusting the rotational speed of the centerless helix such that the mass of dough exiting an output section of the effluent housing is divided into at least one metered portion, where the at least one metered portion exhibits no appreciable temperature or pressure rise over the mass of dough being loaded into the hopper.

Optionally, a motor may be rotatably connected to the centerless helix to provide rotational movement thereto. The centerless helix may be operated in a variable speed mode to control the flow rate of the dough, or may be operated in an intermittent "chunker" mode, where by alternately stopping and starting the motor in response to rotational input from a sensor, discrete dough portions, or chunks, can be formed. In addition, the motor may have a maximum power output not in excess of 1 horsepower, thus enabling the use of a smaller, less costly helix turning power supply. In addition, the effluent housing can be lined with a discharge liner to prevent direct contact between the helix and the effluent housing, and the discharge liner can be made from an ultrahigh weight molecular polymer. As an additional step, the metered dough portions can be deposited onto a conveyor to facilitate movement of the metered dough to another location. A variable frequency speed controller may be connected to the conveyor to vary the speed the metered dough is carried away by the conveyor. A motor controller can also be used to limit motor horsepower, thus ensuring that undue work on the dough is not performed, and that excess driving motor power is not being inefficiently used. As with the previous embodiments, a torque-limiting device, such as in the form of a slip clutch, can operate to protect the motor and helix.

Other objects of the present invention will be apparent in light of the description embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which:

FIG. 5 is a perspective view of a dough transport system according to an embodiment of the present invention.

DETAILED DESCRIPTION

Figure 1:
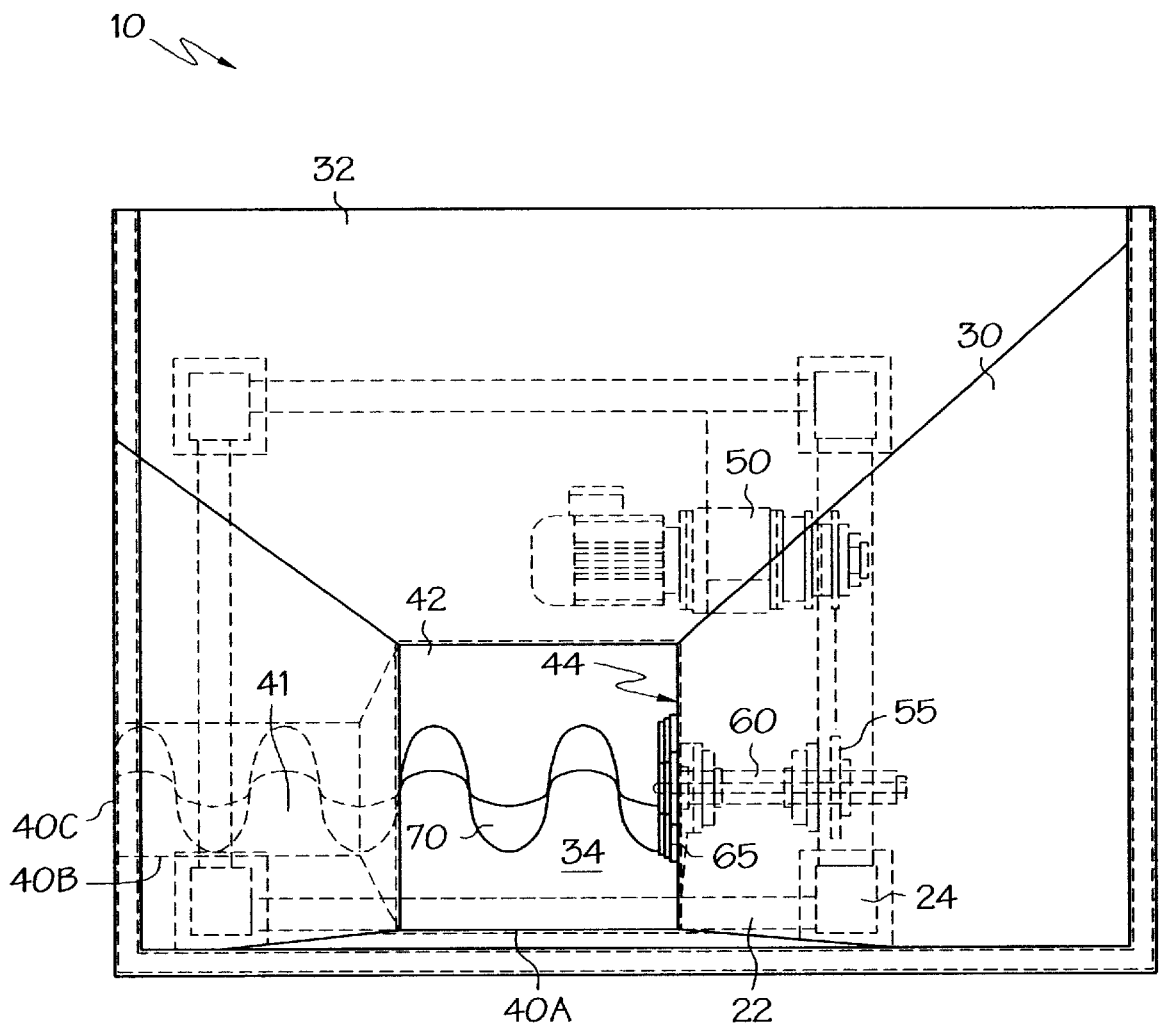
FIG. 1 is a top view showing of a dough feeder unit according an embodiment of the present invention.
Figure 2:
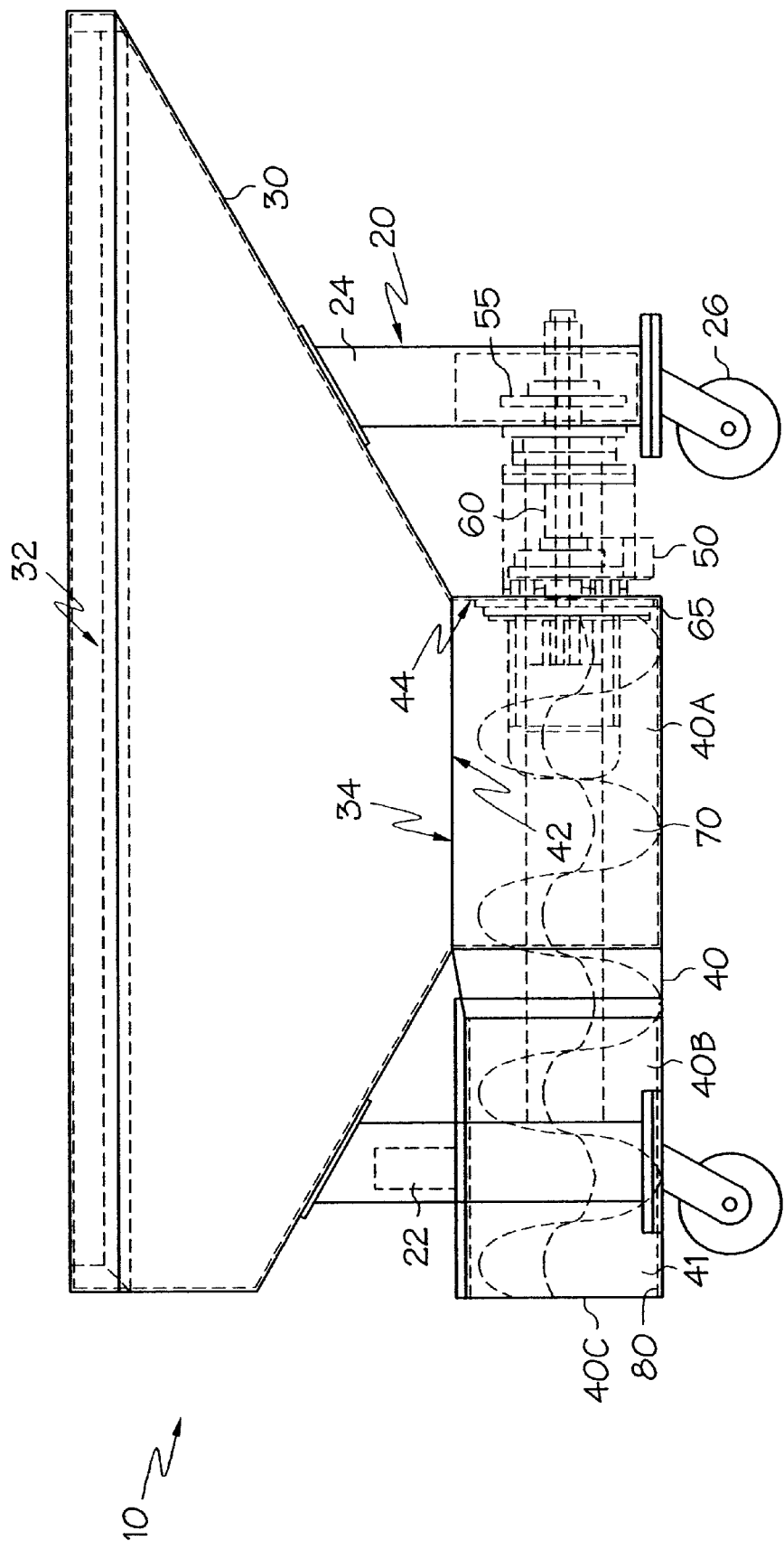
FIG. 2 is a side elevational view of the unit of FIG. 1.
Figure 3:
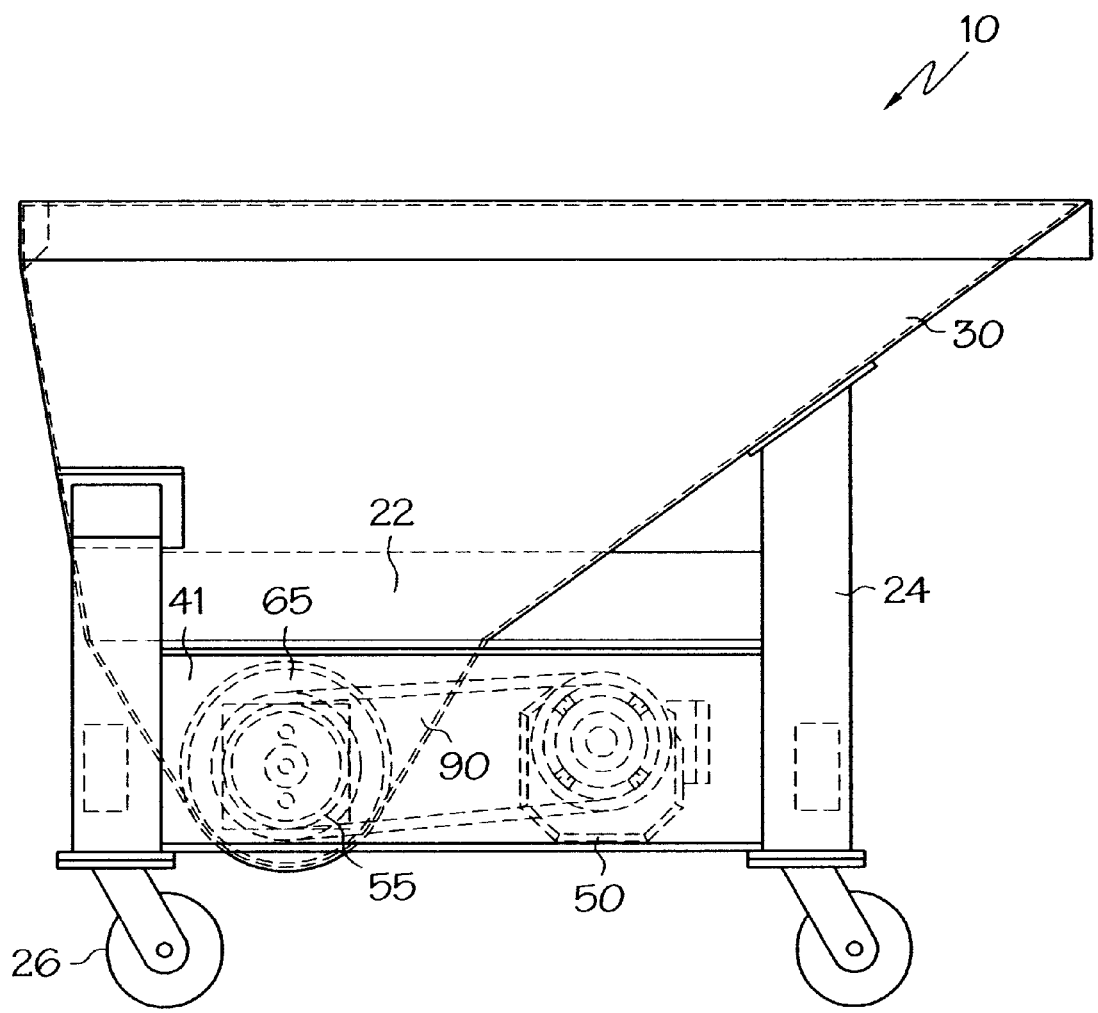
FIG. 3 is an end elevational view of the unit of FIG. 1.

Referring first to FIGS. 1–3, various views of a dough feeder unit 10 are shown. The primary support structure 20 includes horizontal and vertical members 22 and 24, respectively. Primary support structure 20 is mounted on casters 26 to facilitate mobility. Mounted on the upper portion of vertical members 24 is a dough hopper 30, which includes a dough input opening 32 and a dough output opening 34. Beneath dough hopper 30 is effluent housing 40, which includes an inlet section 40A, a center section 40B and an outlet section 40C. The inlet, center and outlet sections collectively define a flowpath 41 for the dough (not shown) to pass through, and may be formed from either a single structural member or discrete components capable of being joined together. An upward-facing aperture 42 in inlet section 40A is in dough communication with dough output opening 34 of hopper 30. Motor 50 is coupled to the primary support structure 20, and includes a conventional belt or chain-drive to rotate shaft 60, which in turn extends through an effluent housing inlet section 40A endwall 44. The motor can be of a variable-frequency type, such that it is capable of providing a broad range of rotational speeds, and hence, dough metering capacities. A torque-limiting device 55, such as a slip clutch, can also be placed on shaft 60 so as to be in operative contact with motor 50 to permit the decoupling of the motor and helix 70. In the event a high resistance to helix 70 rotation is encountered, the torque-limiting device 55 can cut-out, protecting both the helix and the related drive mechanisms. A coupling 65, preferably in the form of a sealing ring, is connected to shaft 60, and mounts to endwall 44. Coupling 65 permits the mounting of a flow control member, preferably in the form of an auger shaped like a centerless helix 70. Centerless helix 70 is disposed within flowpath 41 portion of effluent housing 40. The centerless helix 70 is flattened out at the proximal end to facilitate secure mounting to rotatable coupling 65. In the alternative, centerless helix 70 can be mounted coupling 65 or shaft 60 by way of a stub shaft (not shown) that extends just far enough into centerless helix 70 to establish a secure connection. In that the stub shaft is used merely to connect the helix 70 to the motor 50 through shaft 60, rather than as rotational support for the repeating array of helical blades that make up helix 70, the helix 70 with the stub shaft is still considered "centerless". Upon initiation of an operating sequence, a mass of dough (not shown) disposed in hopper 30 is gravity-fed through dough output opening 34 and aperture 42 of the inlet section 40A of effluent housing 40, and into contact with centerless helix 70, which is rotating in response to the operation of motor 50. The spiral nature of the helix 70 urges the dough through flowpath 41. The intermittent rotating action of the helix 70 ensures even, repeatable metered portions, while not appreciably pressurizing or segmenting the dough, thereby minimizing dough trauma. In the present context "appreciable" or "appreciably" in conjunction with a temperature or pressure quantity means a temperature or pressure level not generally recognized to cause property changes in the dough being subjected to those levels. For example, upon discharge from the outlet section 40C of effluent housing 40, the temperature rise in the dough is negligible (preferably less than one degree Fahrenheit), and the pressure at the exit plane of the outlet section 40C is essentially the same as that of the dough in the hopper 30. By contrast, a temperature change of 2 to 5 degrees Fahrenheit would be considered to be an "appreciable temperature rise". Furthermore, the substantially isothermal condition associated with the present invention is achieved without resort to a supplemental cooling system, such as a water jacket or related refrigeration system. Similarly, appreciable pressure increases through the metering device flowpath is deleterious to dough quality, as such amount of driving force can start to work on the dough. Since there is no appreciable pressure rise through the flowpath 41 of the present invention, the problems of premature dough processing are avoided.

Specifically as shown in the side elevation view FIG. 2, the flowpath 41 represented by effluent housing 40, all of its sections and the centerless helix 70 is shown relative to the remainder of the dough feeder unit 10. A discharge liner 80 is placed on the inner walls of flowpath 41 to avoid metal-to-metal contact between the helix 70 and the inner walls, all of which are typically made from a food-grade material, such as stainless steel. This avoids the formation of metal shavings that could otherwise be deposited into the dough. The discharge liner 80 is preferably made of an abrasion-resistant polymer, such as UHMW polyethylene.

Referring specifically now to FIG. 3, an end-on elevation view of an embodiment of the present invention shows the construction of flowpath 41 of effluent housing 40. The dimensions of the flowpath 41 relative to the centerless helix 70 are more important than the shape itself; for example, the flowpath need not be trough-like (as shown in the figure), but may be square, U-shaped, fluted (or tapered) cylindrical, or a related variation. The relative dimensions stem from the need to keep adequate clearance, thereby ensuring that the flowpath 41 of effluent housing 40 doesn't behave as a pressure vessel.

Figure 4:
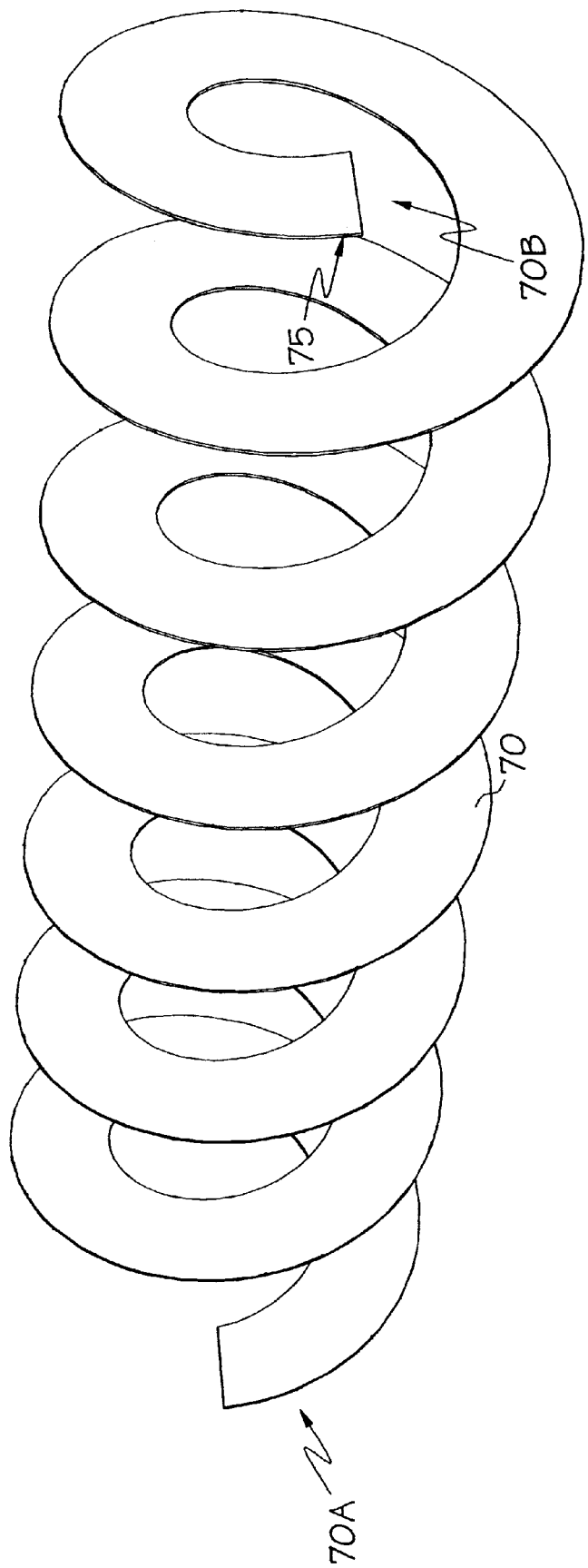
FIG. 4 is a perspective view of a centerless helix flow control device according to an embodiment of the present invention.

As shown in FIG. 4, the construction of the centerless helix 70 includes a continuous, constant pitch screw. The proximal end 70A is adapted to be mounted to sealing ring 65, while distal end 70B is cantilevered. Distal end 70B is substantially coplanar with the outlet section 40C of the effluent housing 40 to promote optimum dough metering and safety performance. The centerless portion 70C of helix 70 minimizes contact with the dough, which has a tendency to stick to surfaces in contact with it. The configuration of the centerless helix is such that, unlike-a screw-based auger, most of the internal volume of the effluent housing chamber can be filled with dough, thus improving throughput. Furthermore, the configuration of the centerless helix 70 promotes the relatively shear-free conveyance of the dough through the effluent housing 40, as, unlike with a screw-based approach, no significant velocity profile extending from the helix center to the outer radius is present. Thus, portions of the dough stream travelling near the cross-sectional center of the effluent housing 40 proceed axially through the housing at about the same speed as the dough near the housing inner wall. By reducing the incidence of shear, less work is being performed on the dough during the metering process. The deflections at the distal end 70B of the helix, due in part to both its cantilever construction and the increased load associated with dough movement, are such that it can contact the flowpath during normal operation. Accordingly, the flowpath liner 80, as previously discussed, prevents the formation of metal shavings during helix-to-flowpath rubbing.

Referring now to FIG. 5, a dough transport system 100 is shown. The dough feeder unit 10, previously described, takes a mass of dough 110, and feeds metered dough portions 115 to conveyor 120, where the dough can be moved to the next step in its processing chain. In one operational mode, the helix rotational speed is varied such that the flow rate, while continuous, can be increased or decreased according to demand. The operational speed of the conveyor 120, which is generally kept constant, could be maintained at such a speed as to gradually pull apart the dough 110 that is being discharged out of the outlet section 40C of effluent housing 40, thus producing a metering effect.

In the alternative to running in the continuous flow, variable speed mode, a chunker mode to meter the dough 110 can be effected. In this mode, the helix 70 can go through either single or multiple substantially constant rotational speed turns, and then be intermittently stopped. This mode, too produces a metering effect, caused by the inherent tensile forces due to either the downward-acting weight of the dough 110 already deposited on the conveyor 120, or the pull exerted by the same as the conveyor 120 moves away. This relative motion causes dough 110 to plastically deform, leading to a gradual thinning and lengthening in dough 110, until the tensile strength of the dough 110 is not adequate to keep it from separating. Once the dough 110 has separated, causing a consistent metered dough portion 115 to be formed, the rotational speed of the helix 70 can be reinitiated to start the metering process over again. This second mode of operation is especially valuable when the dough feeder unit 10 is feeding multiple conveyors (not shown). In either mode, the inclusion of speed-changing and feedback features could optionally be employed into a motor controller 130 to tie into the rotational speed of helix 70 and the conveyor 120, thereby further tailoring the metering needs consistent with the dough's end use. The system 100 configuration abrogates the need for higher power motors (on the order of five to ten horsepower or more). For example, its use as a metering device for dough products rather than as a bulk dough transport permits motors of one-half to one horsepower to be used. Similarly, the lower flow resistance put up by dough that is less likely to bunch up, due to the lower amount of wetted surface area (which, in turn is made possible by the removal of a central shaft), permits the use of lower power motors.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A dough transport system comprising:
    a dough feeding unit comprising:
        a primary support structure;
        a motor coupled to said primary support structure;
        a hopper for storing dough, said hopper including a dough input opening and a dough output opening;
        an effluent housing adjacent said hopper and mounted to said primary support structure, said effluent housing comprising:
            an inlet section aligned with said dough output opening of said hopper;
            an outlet section to dispense said dough; and
            a center section disposed between said inlet section and said outlet section, such that a common surface formed by said inlet, outlet and center sections defines a flowpath through which said dough may flow; and
        a centerless helix with proximal and distal ends, said centerless helix defining an axis of rotation along a centerline thereof, said centerless helix disposed within and extending through said effluent housing, said centerless helix rotatably responsive to said motor through a coupling at said proximal end of said centerless helix, wherein said proximal end of said centerless helix includes a flattened portion to promote secure, thorough mounting to a rotatable coupling disposed within an endwall of said effluent housing in axial alignment with said centerline; and
    a conveyor unit operably mounted in relation to said outlet section of said effluent housing to carry away portions of said dough being discharged from said effluent housing, such that a continuous dough path from said hopper through said effluent housing is effected, and upon placement of a quantity of said dough in said hopper and rotation of said centerless helix, a discrete quantity of dough is deposited upon said conveyor unit without an appreciable rise in pressure or temperature imparted upon said dough.

2. The dough transport system according to claim 1, further comprising a torque-limiting device in communication with said motor.

3. The dough transport system according to claim 2, wherein said torque-limiting device is a slip clutch.

4. The dough transport system according to claim 1, further comprising a discharge liner disposed within said effluent housing.

5. The dough transport system according to claim 4, wherein said discharge liner is made of an ultrahigh molecular weight polyethylene.

6. The dough feeding unit according to claim 1, further comprising a motor controller arranged to limit the power output required of said motor to a maximum of 1 horsepower.

7. The dough transport system according to claim 1, wherein said motor has a maximum power output not in excess of 1 horsepower.

8. The dough transport system according to claim 1, wherein surfaces of said hopper, effluent housing and centerless helix are made of food-grade stainless steel.

9. The dough transport system according to claim 1, further comprising casters disposed on a lower surface of said primary support structure to facilitate the positioning of said dough feeding unit relative said conveyor unit.

10. A dough feeding unit comprising:
    a primary support structure;
    a motor coupled to said primary support structure;
    a hopper for storing dough, said hopper including a dough input opening and a dough output opening;
    an effluent housing adjacent said hopper and mounted to said primary support structure, said effluent housing comprising:
        an inlet section aligned with said dough output opening of said hopper;
        an outlet section to dispense said dough; and
        a center section disposed between said inlet section and said outlet section, such that a common surface formed by said inlet, outlet and center sections defines a flowpath through which said dough may flow; and
    a centerless helix with a proximal and distal end, said centerless helix defining an axis of rotation along a centerline thereof, said centerless helix disposed within and extending through said effluent housing, said centerless helix rotatably responsive to said motor through a coupling at said proximal end of said centerless helix, wherein said proximal end of said centerless helix includes a flattened portion to promote secure, thorough mounting to a rotatable coupling disposed within an endwall of said effluent housing in axial alignment with said centerline such that a continuous dough path from said hopper through said effluent housing is effected, and upon placement of a quantity of said dough in said hopper and rotation of said centerless helix, a discrete quantity of dough is metered without an appreciable rise in pressure or temperature imparted upon said dough.

11. The dough feeding unit according to claim 10, further comprising a discharge liner disposed within said effluent housing.

12. The dough feeding unit according to claim 11, wherein said discharge liner is made of an ultrahigh molecular weight polyethylene.

13. The dough feeding unit according to claim 10, further comprising a motor controller arranged to limit the power output required of said motor to a maximum of 1 horsepower.

14. The dough feeding unit according to claim 10, wherein said motor has a maximum power output not in excess of 1 horsepower.

15. The dough feeding unit according to claim 10, wherein surfaces of said hopper, effluent housing and centerless helix are made of food-grade stainless steel.

16. The dough feeding unit according to claim 10, further comprising casters disposed on a lower surface of said primary support structure to facilitate mobility of said unit.

17. A dough transport system comprising:
   a dough feeding unit comprising:
      a hopper for storing dough, said hopper including a dough input and a dough output;
      an effluent housing in fluid communication with said hopper, said effluent housing comprising:
         an inlet configured to accept dough from said hopper;
         an outlet opposite said inlet such that a flowpath is defined therebetween; and
         a centerless helix disposed within said flowpath; and
      a motor coupled to said centerless helix such that said centerless helix is rotatably responsive thereto; and
   a conveyor unit adjacent said effluent housing such that said conveyor unit is configured to carry away said dough being discharged from said effluent housing without an appreciable rise in pressure or temperature due to the action of said dough transport system.

18. A dough transport system according to claim 17, further comprising a controller coupled to at least one of said dough feeding unit or said conveyor unit, said controller configured to coordinate motor and conveyor speeds such that upon placement of a quantity of said dough in said hopper and rotation of said centerless helix, said effluent housing and said conveyor unit cooperate to deposit said dough onto said conveyor unit.

19. A dough transport system according to claim 18, further comprising an endwall in said effluent housing, said endwall proximate said inlet such that said coupling between said motor and said centerless helix is supported by said endwall.

20. A dough transport system according to claim 19, wherein said centerless helix comprises:
   a proximal end disposed adjacent said inlet, said proximal end terminating in a flattened portion to effect mounted connection to said endwall; and
   a distal end opposite said proximal end.

21. A dough transport system according to claim 19, wherein said centerless helix comprises:
   a proximal end disposed adjacent said inlet, said proximal end terminating in a stub shaft to effect mounted connection to said endwall; and
   a distal end opposite said proximal end.

22. A dough transport system according to claim 17, wherein said motor has a maximum power output not in excess of 1 horsepower.

23. A dough transport system according to claim 17, wherein said appreciable temperature rise comprises a temperature rise of less than one degree Fahrenheit.

24. A dough transport system according to claim 17, wherein said effluent housing comprises an open construction so that no atmospheric pressure difference is present between said flowpath and an ambient environment.

25. A dough feeding unit comprising:
   a hopper for storing dough, said hopper including a dough input and a dough output;
   an effluent housing in fluid communication with said hopper, said effluent housing defined by an internal flowpath and an open construction so that no atmospheric pressure difference is present between said flowpath and an ambient environment, said effluent housing comprising:
      an inlet configured to accept dough from said hopper;
      an outlet opposite said inlet such that said flowpath is defined therebetween, said outlet configured to be adjacent to and in fluid communication with a conveyor unit; and
      a centerless helix disposed within said flowpath; and
   a motor coupled to said centerless helix such that said centerless helix is rotatably responsive thereto, whereby upon operation of said dough feeding unit, said dough can be discharged from said effluent housing and onto said conveyor unit with no appreciable temperature or pressure rise in said dough.

* * * * *

UNITED STATES PATENT AND TRADEMARK OFFICE
CERTIFICATE OF CORRECTION

PATENT NO.     : 6,523,727 B2
DATED          : February 25, 2003
INVENTOR(S)    : William E. Lanham, Jr.

It is certified that error appears in the above-identified patent and that said Letters Patent is hereby corrected as shown below:

Column 3,
Line 18, reads as "metalto-metal", should read -- metal-to-metal --.

Column 6,
Line 36, reads as "unlike-a screw-based", should read -- unlike a screw-based --.

Signed and Sealed this

Sixth Day of May, 2003

JAMES E. ROGAN
*Director of the United States Patent and Trademark Office*